(12) United States Patent
Gadir

(10) Patent No.: US 8,577,823 B1
(45) Date of Patent: Nov. 5, 2013

(54) TAXONOMY SYSTEM FOR ENTERPRISE DATA MANAGEMENT AND ANALYSIS

(76) Inventor: Omar M. A. Gadir, Sunnyvale, CA (US)

(*) Notice: Subject to any disclaimer, the term of this patent is extended or adjusted under 35 U.S.C. 154(b) by 202 days.

(21) Appl. No.: 13/134,251

(22) Filed: Jun. 1, 2011

(51) Int. Cl.
| G06F 17/00 | (2006.01) |
| G06F 15/16 | (2006.01) |
| G06N 99/00 | (2010.01) |
| G06F 17/30 | (2006.01) |
| H04L 29/08 | (2006.01) |

(52) U.S. Cl.
CPC ........ G06N 99/005 (2013.01); G06F 17/30592 (2013.01); H04L 29/08072 (2013.01)
USPC .............................. 706/45; 707/600; 709/201

(58) Field of Classification Search
None
See application file for complete search history.

(56) References Cited

U.S. PATENT DOCUMENTS

| 5,463,773 | A | 10/1995 | Sakakibara | |
| 6,553,365 | B1 * | 4/2003 | Summerlin et al. | 707/740 |
| 6,665,681 | B1 | 12/2003 | Vogel | |
| 6,910,040 | B2 * | 6/2005 | Emmick et al. | 1/1 |
| 7,702,644 | B2 | 4/2010 | Bush et al. | |
| 7,877,344 | B2 | 1/2011 | Seuss | |
| 7,890,626 | B1 | 2/2011 | Gadir | |
| 8,229,936 | B2 * | 7/2012 | Brown et al. | 707/754 |
| 2004/0139059 | A1 | 7/2004 | Conroy et al. | |
| 2005/0010458 | A1 | 1/2005 | Holloway et al. | |
| 2006/0080327 | A1 | 4/2006 | Gramling et al. | |
| 2010/0114895 | A1 | 5/2010 | Bhagwan et al. | |

* cited by examiner

Primary Examiner — Alan Chen

(57) ABSTRACT

The present invention provides taxonomy system for enterprise data management and analysis. Building a taxonomy is based on defining taxonomy themes to solve different aspects of enterprise data management. For each theme, a taxonomy is created by classifying data related to the theme. Taxonomy nodes include enterprise data management policies and data analysis methods to be applied to data stored at the nodes. The amount of data that companies need to access and manage today is complex and voluminous. Because of computational requirements and time constraints, it is very difficult to classify and process all data. In many cases, current solutions ignore a sizable amount of data and process a small subset of it. This leads to incomplete and inaccurate results as ignored data may contain valuable information. The present invention provides taxonomies that encompass all data. Voluminous data is processed first to eliminate irrelevant data that is not related to the theme of a taxonomy. This in effect reduces the amount of data used to create the taxonomy without impacting its accuracy.

19 Claims, 12 Drawing Sheets

TAXONOMY SYSTEM FOR ENTERPRISE DATA MANAGEMENT AND ANALYSIS

BACKGROUND OF THE INVENTION

The invention relates to taxonomy system for enterprise data management and analysis.

The concept of taxonomy evolved from the life sciences. In the scientific community, taxonomies were conceived as a way to organize and categorize life forms into a structured and controlled hierarchy. In this approach, a plant or animal is placed in a single spot describing its hierarchical relationship to other plants and animals.

Classification or categorization of animals and plants is the arrangement of entities in a hierarchical series of classes. A class is defined as a collection of similar entities, where the similarity consists of the entities having attributes or traits in common. Corporate taxonomy, sometimes referred to as business taxonomy, is a hierarchy of categories used to classify documents, digital assets and other information. Taxonomies is can cover virtually any type of physical or conceptual entities (products, processes, knowledge fields, human groups, etc.).

The application of taxonomy as a means to organize business content is a complex issue. Unlike the categorizing of life forms, categorizing business documents can be ambiguous. A document could be placed in multiple categories depending on the business context or expertise of the user. This added level of classification complexity in the business setting makes the design and construction of taxonomy structures more challenging. Corporate taxonomies are increasingly used in information systems, particularly content management and knowledge management systems, as a way to allow instant access to the right information within exponentially growing volumes of enterprise data.

Enterprise data management is the development and execution of policies, practices and procedures that properly manage enterprise data. The typical enterprise has data stored in a variety of data sources. Some aspects of data management are: security and risk management, legal discovery, storage resource management (SRM), information lifecycle management (ILM) and content-based archiving. In addition, some companies have their own internal management policies. A policy is an action or a set of actions to be performed on data. For instance, a policy action could be deletion of a category of data. Another aspect of data management is data auditing. Data auditing allows enterprises to validate compliance with federal regulations and insures that data management objectives are being met.

Data analysis is the process of studying, culling, summarizing data to extract useful information. It is used by business, financial organizations, academic institutions and government agencies to acquire meaningful insights from data and predict futuristic trends. It helps to cut costs, improve revenue, reduce risks and enhance performance.

In many aspects of enterprise data management it is not enough to find a document that contains a term. What is needed is the relationship between documents and the ability to track changes in the relationship when new documents are added or existing documents are modified. For instance, when investigating payments plans, it is important to find documents that include modifications to payment plans and related contracts. Management policies should be applied to all related documents. When a policy is to retain, restore, or protect documents about payment plans, the policy should be applied to all related documents. Another example is when categorizing documents under "international commerce", there is need to find all documents that contain terms such as foreign trade, import, export and free trade. The relationship between documents also helps an enterprise to perform data analysis that leads to good business decisions. For instance, by finding documents related to payment plans, an enterprise can analyze the data and modify contracts to maximize revenue generation or reduce risks. A solution to the problem of determining the relationship between documents and their inter-dependencies is to provide a taxonomy that organizes and classifies enterprise data in a systematic and structured manner.

Categorization of data is based on metadata or full text search. Metadata consist of information that characterizes data. Sometimes it is referred to as "data about data". Categorization rules specify how data is classified into different groups. Data categorization methods, based on metadata, group data according to information extracted from its metadata. A few examples of such information are: the time a document was last accessed, its owner, its type and its size. There are many methods for accessing and extracting information from metadata. Some methods utilize file system utilities. File system utilities can only extract file system metadata, sometimes referred to as file system attributes. Document parsers, sometimes called filters, are used for extracting metadata from documents, such as Microsoft Word, Microsoft PowerPoint and PDF files. Examples of such metadata are: document type, publisher, author, subject, etc. The three top commercial parsers being used now are: Stellent, KeyView and iFitler. Some software developers write their own parsers or use open source parsers such as Apache POI. Results of extracting metadata are stored in a repository accessible during classification. Classification based on full text utilizes a search index built by a search engine. Full text search is used to identify documents that contain specific terms, phrases or combination of both. The result of the search is used to categorize data. One of the widely used open source search engines is Lucene.

There are many classification technologies for building corporate taxonomies. The most common ones are: Rule-based, Bayesian, Linguistic and Semantic, Support Vector Machine and neural networks. Bayesian, Linguistic and Semantic, Support Vector Machine, neural networks, and similar methods are collectively referred to as non-rule-based classification methods.

Rule-based systems define the criteria by which a document is classified. The rule measures how well a given document meets the criteria for membership in a particular class. The rule can be applied to the content or the metadata. Boolean logic is used to combine words and phrases using the words AND, OR, and NOT (otherwise known as Boolean operators) to define classification more accurately. For example, a rule could be defined as all documents in a content that include the terms "San Francisco," OR "Los Angeles," OR "San Diego" AND "California" be included in a category called "Cities, California". Besides the content of documents, rules can be applied to metadata. For instance, a rule may specify that only Microsoft Word and Excel documents owned by marketing OR sales, and created during the current fiscal year be included in a category called "Marketing and Sales, Current Fiscal Year". Rules must be carefully articulated and made as unambiguous as possible. A user may elect to provide a complex query all at once, or through a series of interactions with the system, thus potentially broadening or narrowing the scope of the query.

Bayesian probability theory is a means of quantifying uncertainty. The theorem defines a rule for refining a hypothesis by factoring in additional evidence and background information, and leads to a number representing the degree of probability that the hypothesis is true. It uses statistical models from words in training sets, and uses pattern analysis to assign the probability of correlation.

Linguistic and semantic approach is language dependent. Documents are clustered or grouped depending on meaning of words using thesauri, custom dictionaries (e.g. a dictionary of abbreviations), parts-of-speech analyzers, rule-based and probabilistic grammar, recognition of idioms, verb chain recognition, noun phrase identifiers, and linguistic or semantic clustering.

Support Vector Machine (SVM) calculates the maximum separation, in multiple dimensions of one document from another. Each document is represented as a vector. SVM continuously analyses documents and separates them into either the relevant space or the irrelevant space.

A neural network utilizes artificial intelligence to build an interconnected system of processing elements, each with a limited number of inputs and outputs. Rather than being programmed, these systems learn to recognize patterns. Neural networks are an information processing technique based on the way biological nervous systems, such as the brain, process information.

Bayesian, Linguistic and Semantic, Support Vector Machine and neural networks classification methods often require complex computation and could be referred to as computationally intensive classification methods. The complexity is exacerbated by the intricacy and size of enterprise data. In this document, the terms "computationally intensive classification" and "non-rule-based classification" are used interchangeably.

Because of data explosion, some enterprises and organizations have hundreds of millions of documents of different formats stored in hundreds of terabytes of storage. Classification of voluminous data is very costly because of the computational resources needed and the time it takes to process all data. The time required to perform data classification can run into weeks, in particular when computationally intensive classification methods are used. For this reason many existing solutions process only a subset of the data that staff members in the information technology (IT) department think it contains all relevant information. This subset is usually a small percentage, sometimes in the order of 5% of the total data. The assumption here is that excluded data does not include relevant information. This assumption is difficult to validate and is risky. Many times enterprises were fined by regulators because of their failure to comply with government regulations related to protection of all private data. The failure is due to the fact that the subset of data processed does not include all data that needs protection. In conclusion, processing a subset of the data results in inaccurate classification and that in effect results in imprecise and incomplete taxonomies.

During the last few years, many enterprises have adopted cloud computing. Cloud computing has many definitions. According to National Institute of Standards and Technology (NIST), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. Cloud computing adoption is accelerating. For this reason it is imperative that data in a cloud computing environment should be included in taxonomies.

The procedure for building taxonomies can be divided in two approaches: rule-based classification and non-rule-based classification. The non-rule-based classification is sometimes referred to as machine learning. In the first approach, a domain expert decides on the structure of the taxonomy tree and assigns a rule-based classification to each node of the tree. Once a rule is set up, large numbers of incoming documents are automatically gauged against the rule for membership of a taxonomy node. In machine learning based classification, an administrator presents the system with positive and negative sample documents for membership in a node. Positive sample documents are expected to be included in a node. Negative sample documents are not included. From these samples the system learns and builds a model to be used in data classification, which is then used to decide whether a subsequently presented document belongs to a node. The effort for training can be significant, as the administrator may have to provide several hundred to thousands of documents for training the system. A variety of mathematical models and algorithms are used in automatic classifiers based on machine learning, including several flavors of Bayesian inference, Bayesian networks, neural networks, and Support Vector Machines.

The complexity of enterprise data and the information explosion has reached the point where no information architect within an organization can build a comprehensive taxonomy that fully describes the data in a manner similar to life science taxonomy. The problem is exacerbated by the ambiguity of languages. Even when using automated classification methods, information architects lack adequate grasp of all the various themes and topics represented in an enterprise data and for this reason cannot be relied on to extract a hierarchy of concepts and label them into a comprehensive taxonomy. Even within a single organization, it is extremely difficult, to build a single taxonomy tree that covers all enterprise data and captures important relationships between all documents. Such trees are non-existent.

Because of the prohibitive difficulty of building a single taxonomy tree that covers all enterprise data, in particular when data is voluminous, it is time for a new pragmatic approach that includes all data. The approach is based on defining taxonomy themes to solve different aspects of enterprise data management and data analysis. For each theme, a taxonomy is built by classifying data related to the theme. When data is voluminous, irrelevant data that is not related to the theme and does not impact the accuracy of the taxonomy is filtered out first. This results in less data to be processed by the taxonomy.

SUMMARY OF THE INVENTION

In general, in one aspect, the invention provides system and method for building taxonomy for enterprise data management and analysis. The system accesses enterprise data sources and classifies documents using rule-based classification methods, based on metadata and full text search and non-rule-based classification methods. Classified documents are included in taxonomy nodes. Some nodes include data management policies. At each node that includes a data management policy the policy is applied to data stored at that node.

In general, in another aspect of the invention, a hierarchical taxonomy tree is created. Each node includes classification criteria in the form of a rule-based classification expression and a tag to be used for tagging classified data. Some nodes include enterprise data management policies. At each node only data owned by its parent node is classified and tagged. This results in data reduction as one moves from a parent node to its child. In a taxonomy, a leaf node has the least amount of data compared to other nodes in the same branch. Data reduction enables execution of computationally intensive classification and data analysis at leaf nodes or nodes close to leaf nodes. Without data reduction, computationally intensive classification and data analysis require extensive computer resources and time.

In another aspect of the invention, enterprise data management hierarchical taxonomy is created using interactive rule-based classification methods. After each classification sample documents are used to verify accuracy of classification.

In general, in another aspect of the invention, enterprise data management hierarchical taxonomy is created using iterative rule-based classification.

Because of the difficulty of processing complex and large amount of enterprise data, most of the existing taxonomy systems cover only a subset of the data. In many instances this leads to inaccurate data management and analysis. The invention offers a solution that encompasses all data. The solution is based on defining different taxonomy themes for different aspects of enterprise data management and analysis. For each theme, a taxonomy is built by classifying only data related to the theme. Irrelevant data that is not related to the taxonomy and does not impact its accuracy is not included in the taxonomy.

In general, in another aspect of the invention, if data processed by a taxonomy is voluminous, data reduction is attained by classifying irrelevant data using a rule-based classification expression and storing the expression in a new node inserted before the first node of the taxonomy. The rule-based classification expression at the new node filters out irrelevant data that does not impact accuracy of the taxonomy.

In general, in another aspect of the invention, if in a taxonomy there is a node that includes computationally intensive data classification and/or data analysis, data reduction at that node is attained by classifying irrelevant data at that node using a rule-based classification expression. The classification expression is stored in a new node inserted before the node where the computationally intensive data classification and/or data analysis is performed. The rule-based classification expression at the new node filters out irrelevant data that does not impact accuracy of the computationally intensive data classification and/or data analysis.

In general, in another aspect, the invention provides system and method to verify the accuracy of a taxonomy for data management and analysis. At each node positive and negative sample documents are selected. A classification expression is executed at each node. If a node includes a data management policy, the policy is executed. The sample documents are used to verify result of the classification and the execution of the policy. If unexpected results are obtained, the classification expression and the management policy are interactively modified and executed. The process is repeated till expected results are obtained.

Enterprise data changes over time, sometimes at a very high rate. Modifying data or adding new data may render taxonomies for data management and analysis inaccurate. When this happens, affected taxonomies should be rebuilt. If data is voluminous, rebuilding a taxonomy may take a long time. In general, in another aspect of the invention, when new data is added or existing data is modified, incremental classification is performed on the new and modified data and the result is included in the taxonomy. Incremental classification is executed using classification expressions stored in taxonomy nodes, starting at the root node and then moving down the hierarchy of the taxonomy. If at a node the new and modified data do not satisfy the classification expression stored in that node, the incremental classification is terminated, as there is no new or modified data that impacts subsequent children nodes. Data management policies and/or data analysis methods are executed on new and/or modified data. Incremental classification takes less time than rebuilding a taxonomy.

DETAILED DESCRIPTION

Figure 1:
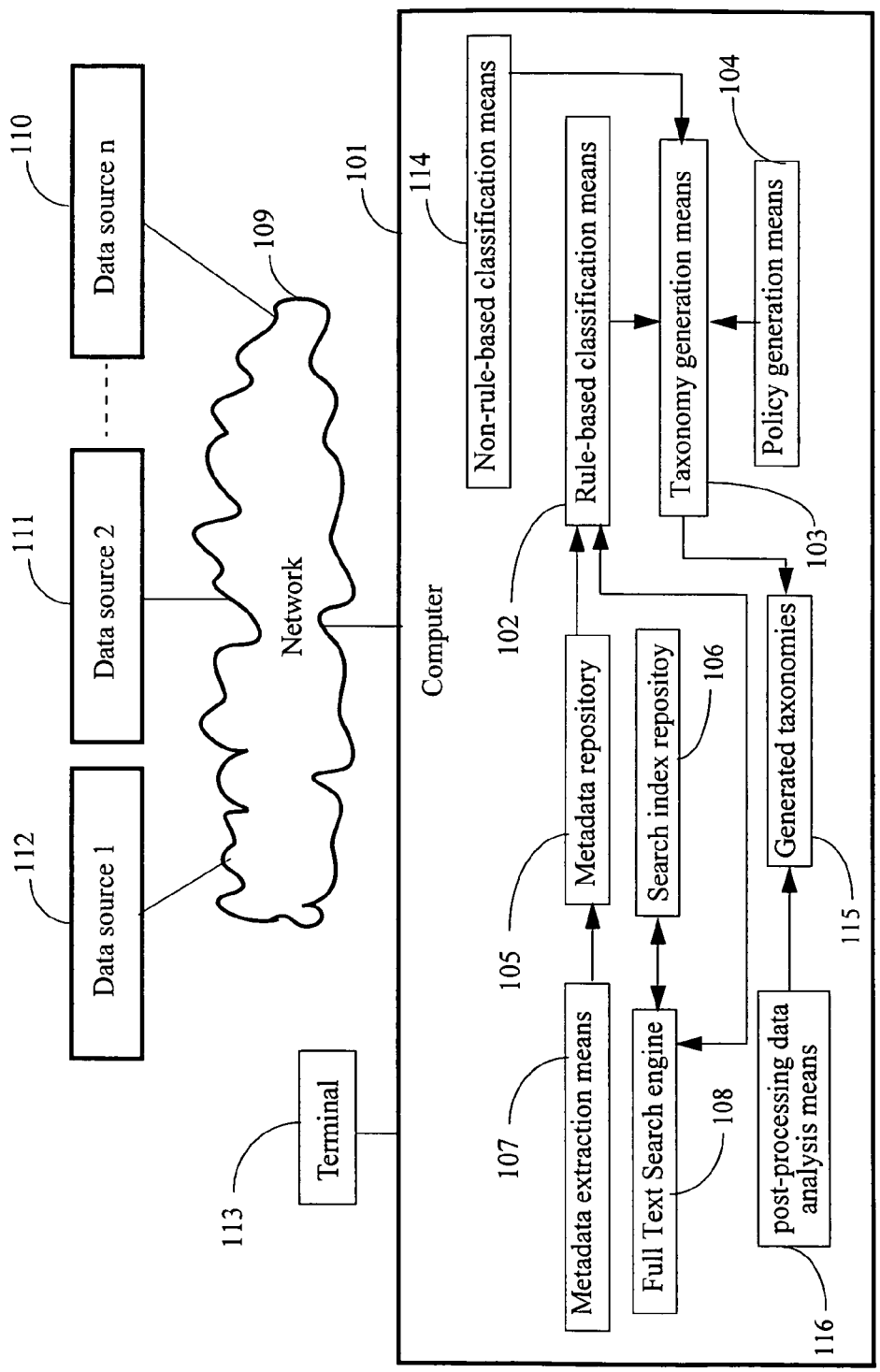
FIG. 1 illustrates a system for generating a taxonomy for enterprise data management and analysis.

FIG. 1 illustrates a system for generating a taxonomy for enterprise data management and analysis according to one aspect of the invention. The system consists of a computer (101) connected to network 109, through which it communicates with data sources connected to the network. The data sources are: data source 1 (112), data source 2 (111), . . . , and data source n (110). The computer typically consists of one or more instruction processors (generally referred to as CPUs), buses, memory, storage units, power supplies, motherboards, expansion slots, and interface boards. The computer runs an operating system, and one or more application programs. For example, application programs may include software modules, sequences of instructions, routines, data structures, display interfaces, and other types of structures that execute operations of the current invention. The computer may be a server computer, Personal Computer (PC), a workstation, laptop computer, multiprocessor systems, microprocessor-based systems, set top boxes, programmable consumer electronics, minicomputers, mainframe computers, distributed computing environments that include any of the above systems or devices, and the like. The computer accesses documents stored in the data sources. Metadata extraction means 107 extracts metadata from the documents and stores the metadata in the metadata repository 105. Full text search engine 108 builds a search index for the documents and stores the index in the search index repository 106. The computer includes rule-based classification means 102, which classifies documents based on metadata stored in metadata repository 105. The rule-based classification means 102 also formulates search queries as part of the classification process. The full text search engine 108 processes the queries and performs full text search by accessing the search index repository 106. The rule-based classification means 102 uses the result of full text search to classify data. The non-rule-based classification means 114 classifies data using one or a combination of Bayesian analysis, Linguistic and Semantic analysis, Support Vector Machine, neural networks analysis, and similar methods. The computer also includes policy generation means (104), which generates policies to be applied to classified data. Classified data and the policies are used by the taxonomy generation means (103) to generate a taxonomy for enterprise data management and analysis. Reference number 115 represents a generated taxonomies. Reference number 116 represents post-processing data analysis means. The post processing data analysis means performs data analysis on data stored in a taxonomy. A user accesses and interacts with the computer using terminal 113 which is directly connected to the computer. The terminal provides graphical user interface and command line interface to the computer. The terminal can also be a Personal Computer (PC), a laptop computer, a wireless Personal Digital Assistant (PDA), a cellular telephone, or any other wired or wireless device that can access the computer over network.

In another embodiment of the invention, a system for generating a taxonomy for enterprise data management and analysis is implemented in a cluster of computers.

In another embodiment of the inventions, taxonomies are created for data in a cloud computing environment.

In another embodiment of the invention, a taxonomy is created for data in multiple cloud computing environments.

In another embodiment of the invention, a taxonomy is created for data in a plurality of cloud computing environments and a plurality of non-cloud computing environments.

Figure 2:
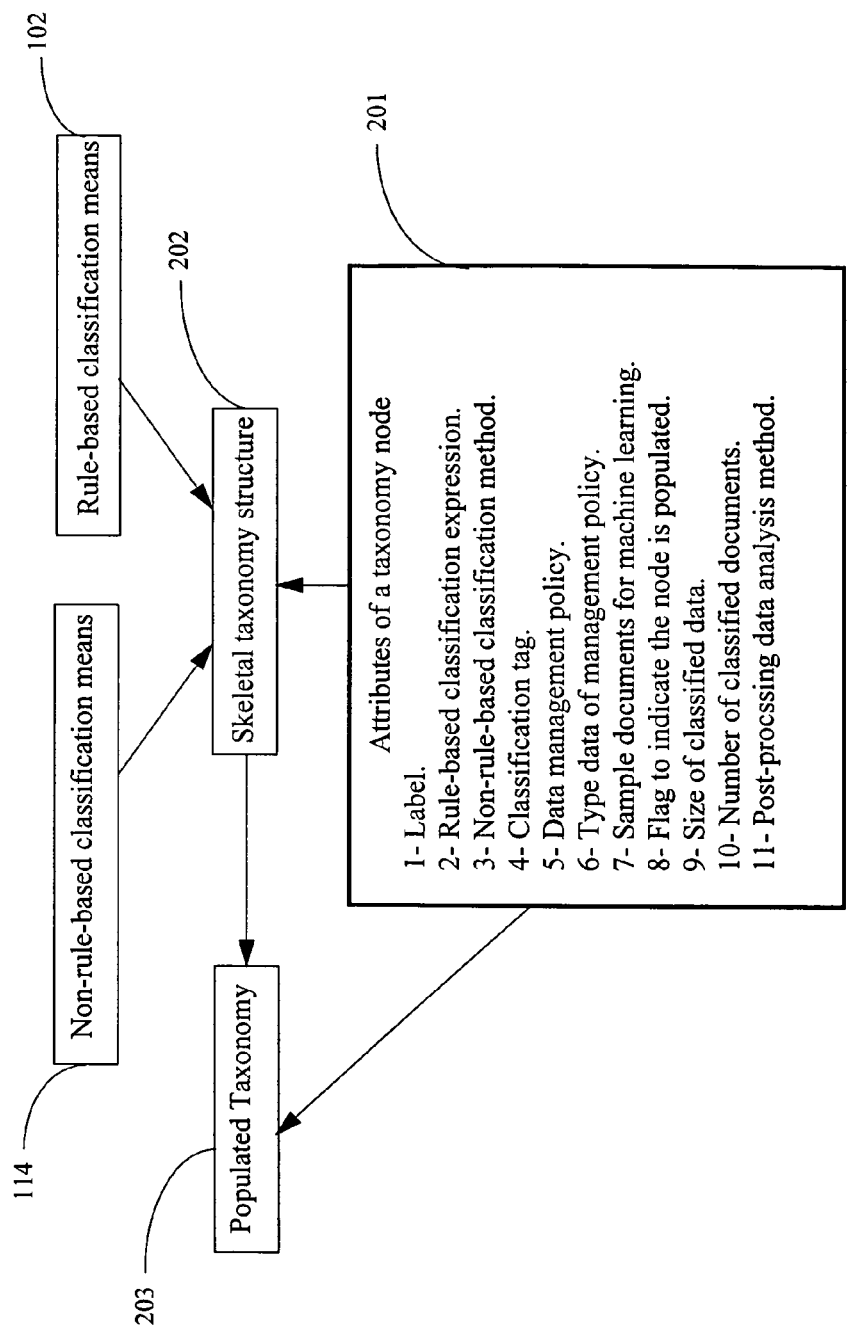
FIG. 2 illustrates the components used for generating a taxonomy.

FIG. 2 illustrates the components used for generating a taxonomy. Classification used for building a taxonomy is provided by the rule-based classification means 102 and the non-rule-based classification means 114. The skeletal taxonomy structure 202 is a hierarchy of taxonomy nodes. Each node includes classification criteria in the form of classification expression or method; but there are no documents stored in the node, in other words the taxonomy is not populated.

Nodes of skeletal taxonomy include some of the attributes shown in 201. During creation of a skeletal taxonomy, each node is assigned a label. Labels reflect the distinctiveness of the node from other nodes and can summarize the content of the node. The label can be taxonomy category, a term, a letter, a number, a name, location, date, etc. The attributes of a node in a skeletal taxonomy also include a rule-based classification expression or a non-rule-based classification method. In this document, non-rule-based classification is sometimes referred to as computationally intensive classification. The attributes also include a tag to be used for tagging the classified documents, and a data management policy to be applied to the tagged data. A policy is only applied to data stored in the node where the policy exists. The data management policy is optional, as data stored in some nodes may not need policy. The attributes also include the type of data management policy. The policy could be regulatory or non-regulatory. Examples of the regulatory policies are: legal discovery, Personally Identifiable Information (PII), Family Educational Rights and Privacy Act (FERPA), etc. Non-regulatory policies are related to enterprise internal policies about confidentiality, who has access to data, etc. If the classification method is based on machine learning, the attributes of a taxonomy node include sample documents to be used for machine learning. After data classification at a node is completed and the node is populated with classified data, the flag in the attributes is set to indicate that the node is populated. The size of classified data and number of classified documents are added to the attributes. The rule-based classification means 102 and the non-rule-based classification means 114 are used to classify data based on classification expressions or methods specified in the attributes. After a skeletal node is completed, data classification and tagging are performed automatically. At each node, classified data and tags are stored in the node and the node becomes populated. After all nodes of the skeletal taxonomy are populated the taxonomy becomes populated (203). The attributes of a node may also include a post-processing data analysis method. The post-processing method performs analysis of the data stored in that node. It is referred to as post-processing because it is done after a taxonomy is populated. The analysis depends on the type of data. For instance, assume one of the taxonomy nodes includes data about marketing and sales. Post-processing to perform market analysis could be applied to data stored in that node. The analysis could be based on descriptive statistics or other market analysis methods.

A skeletal taxonomy is designed by a person with domain knowledge. All attributes of a node could be assigned before a node is populated with classified data, except size of classified data, number of classified documents, and the flag to indicate the node is populated.

There are many ways to store taxonomies, their attributes and data. They could be stored in one or a combination of: data structures, databases, folders and files, etc. For instance, a list of tagged documents and sample documents for machine learning can be stored in a file or database, while the rest of a taxonomy node attributes are stored in a data structure. Alternatively, a list of tagged documents and sample documents for machine learning could be stored in the same data structure with other attributes of the node. The taxonomy could also be stored in an XML file or other structured files. In this document, the expressions "is assigned to a node", "is stored in a node", "is included in a node, and "is attached to a node" are used interchangeably to indicate that an attribute or data is added to a node.

Figure 3:
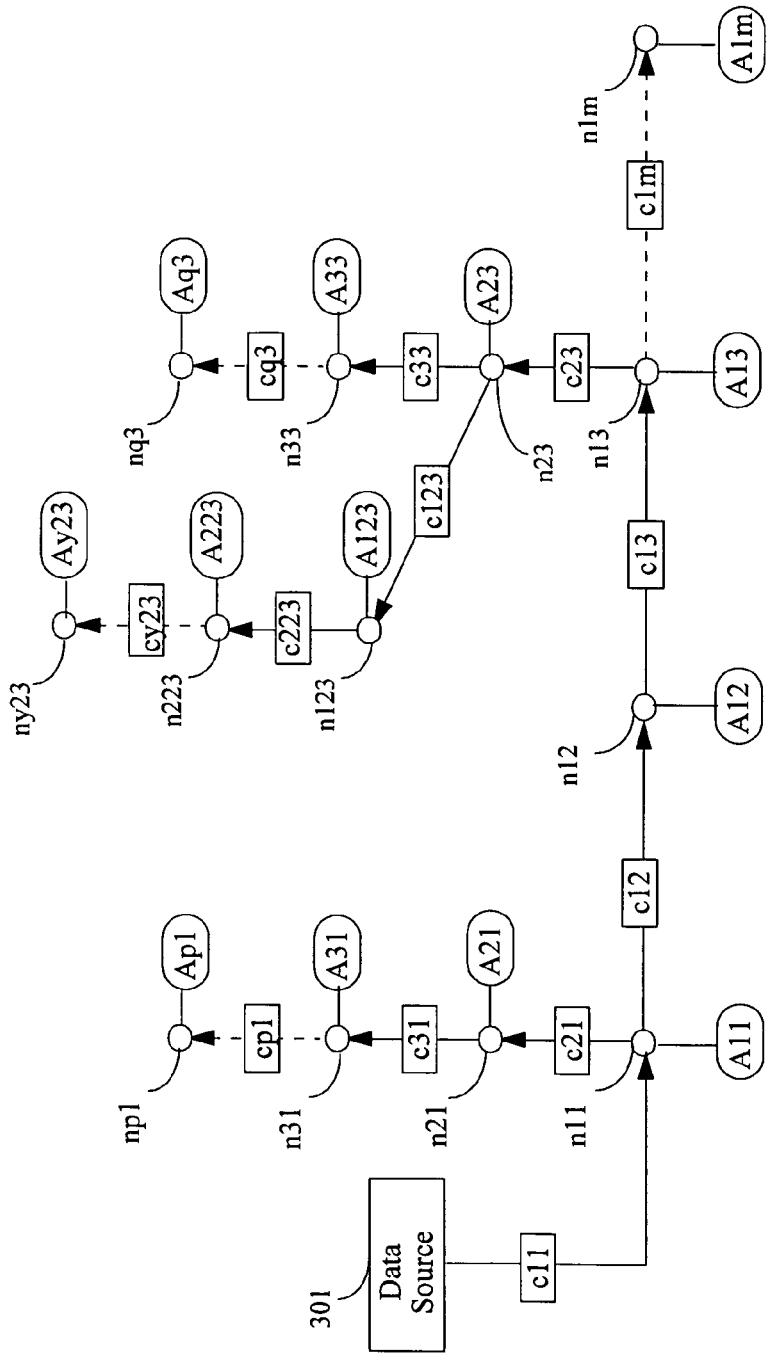
FIG. 3 illustrates a skeletal taxonomy tree for enterprise data management and analysis.

FIG. 3 illustrates a skeletal taxonomy tree for enterprise data management and analysis. Enterprise documents are stored in data source 301. A rule-based classification expression c11 for the first node of the first taxonomy branch is created. The first node is referred to as the root node. Each subsequent iteration creates a child node. The terms "rule-based classification expression" and "classification expression" will be used interchangeably in this document. The classification expression is based on metadata and full text search. Node n11, the first node in the first taxonomy branch is added. A11 represents taxonomy attributes owned by node n11. The attributes of a taxonomy node are shown in 201, FIG. 2. The classification expression c11 is included in A11. Node n11 is labeled and the label is included in A11. A tag, to be used for tagging data that will be classified at node n11 is created and is included in A11. Data management policy is also included in A11. The naming convention followed in FIG. 3 is that classification expression cxx is used to create node nxx, and taxonomy attribute Axx is owned by node nxx.

Classification expression c12, to be used for classifying data that will be tagged with the tag owned by n11, is created. Node n12 is added. The classification expression c12 is included in A12. Node n12 is labeled and the label is included in A12. A tag to be used for tagging data that will be classified at node n12 is created and is included in A12. Data management policy is also included in A12. The next node n13 is created in a similar fashion using classification expressions c13 and its attributes are included in A13. The process is repeated and more nodes are added to the branch until the last node n1*m*. The last node has no children and is referred to as a leaf node. Node n1m is added by classifying documents tagged with the tag stored in the node preceding it using the classification expression c1m. The classification expression c1m is included in A1m. Node n1m is labeled and the label is stored in A1m. A tag, to be used for tagging data that will be classified at node n1m is created and is included in A1m. Data management policy is also included in A1m.

Nodes n11, n12, n13, . . . , and n1m form the first or main branch of the taxonomy tree. Other branches could be added starting at any node of the main branch. For example, in FIG. 3, a branch starting at node n11 is created. Classification expression c21 to be used for classifying data that will be tagged with the tag owned by n11 is created. The classification expression c21 is different from the classification expression c12. Node n21 is added. The classification expression c21 is included in A21. Node n21 is labeled and the label is included in A21. A tag, to be used for tagging data that will be classified at node n21 is created and is included in A21. Data management policy is also included in A21. The remaining nodes in the branch, n31, . . . , np1, are created in a similar fashion using classification expressions c31, . . . , cp1 and their corresponding attributes are included in A31, . . . , Ap1, respectively.

Another branch consisting of nodes n23, n33, . . . , and nq3, is created in a similar fashion starting at node n13, using classification expressions c23, c33, . . . , cq3 and their attributes are included in A23, A33, . . . , Aq3, respectively. Sub-branches could also be added to the taxonomy tree. For example, in FIG. 3, a sub-branch consisting of the nodes n123, n223, . . . , and ny23 is created in a similar fashion starting at node n23, using classification expressions c123, c223, . . . , cy23 and their attributes are included in A123, A223, . . . , and Ay23, respectively. Classification expressions in the skeletal taxonomy tree are executed and the nodes are populated with data. After a node is populated with data, size of classified data, number of documents classified and the flag to indicate the node is populated are added to the attributes of the node.

In another embodiment of the invention, a taxonomy tree is built in stages, building the main branch first and then, later, adding branches and sub-branches.

In another embodiment of the invention, populating a node with data is done while nodes are added to a taxonomy.

In another embodiment of the invention, attributes of taxonomy nodes could be added in different order to the one explained in FIG. 3. For instance, tags and labels could be added after data classification rather than before it.

In another embodiment of the invention, a taxonomy is created and populated using interactive classification. This is done by first executing a classification expression to isolate data related to the taxonomy. If the desired results are not obtained, the classification expression is refined and is executed again. This is repeated until desired results are obtained. When desired results are obtained a node is created, populated with data, and node attributes are added. Then, another classification expression is created to classify data stored in the first node. The purpose of classification is to create the second node. If desired results were not obtained, the classification expression is refined and is executed again. This is repeated until desired results are obtained. When desired results are obtained the second node is created, populated with data, and node attributes are added. The process is repeated until all nodes of a taxonomy are created.

In another embodiment of the invention, a taxonomy is created using non-rule-based classification methods.

In another embodiment of the invention, a taxonomy is created using both rule-based and non-rule-based classification methods.

In another embodiment of the invention, a taxonomy is automatically created and populated using iterative classification. In iterative classification, classification expressions are executed iteratively one after another. After each iteration a taxonomy node is automatically created, populated with classified data, and attributes of the node are added.

In another embodiment of the invention, a taxonomy is created using interactive and iterative classifications.

In another embodiment of the invention, taxonomy nodes are created automatically using a non-rule-based classification and learning samples. The learning samples consist of positive and negative sample documents for membership in a node. Positive sample documents are expected to be included in a node. Negative sample documents are not included. From these samples the system learns and builds a model to be used in data classification, which is then used to decide whether a subsequently presented document belongs to a node. In addition to classification criteria, the model includes management policies and other node attributes.

In another embodiment of the invention, a skeletal taxonomy, in which some nodes that can be replaced by multiple nodes, is created first. The replacement multiple nodes are added later using rule-based and/or non-rule-based classifications.

In another embodiment of the invention, the hierarchy of a taxonomy tree is modified by adding nodes, deleting nodes, adding branches and deleting branches.

In another embodiment of the invention, multiple nodes in a taxonomy branch are replaced by a single node by combing rule-based classification expressions at the nodes into a single expression using the Boolean operators AND, OR and NOT. The single expression is included in the single node. Alternatively, rule-based classification expressions at the nodes are replaced by a regular expression.

Figure 4:
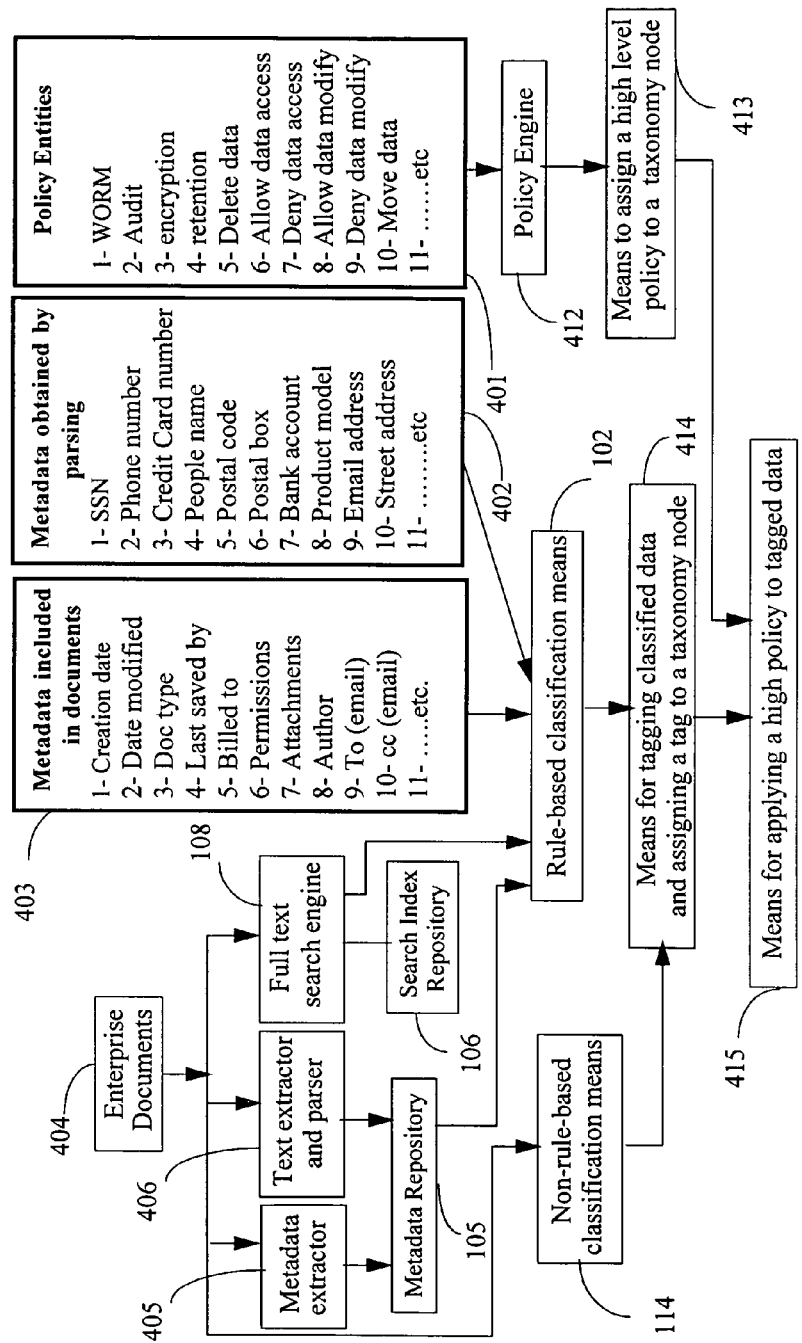
FIG. 4 illustrates the components used for classification and policy management.

FIG. 4 illustrates the components used for classification and policy management. Rule-based classification of enterprise data is based on metadata and full text search. There are two types of metadata: metadata included in documents like Microsoft Word, PDF, etc., and metadata obtained by parsing the textual content of a document. Examples of metadata included in a document are: document creation time, date a document is modified, etc. Examples of metadata obtained by parsing the textual content of a document are: Social Security Number (SSN), phone number, credit card number, etc. Parsing textual content of a document is based on formulating an expression that represents the format of an item need to be extracted and parsing the document to find the matching strings of text. Sometimes regular expressions are used to represent formats of the items to be extracted. A regular expression provides a concise and flexible means for matching strings of text, such as particular characters, words, or patterns of characters. A regular expression is written in a formal language that can be interpreted by a regular expression processor, a program that either serves as a parser generator, or examines text and identifies parts that match the provided specification.

In FIG. 4, 403 is a list of metadata included in documents, 402 is a list of metadata obtained by parsing textual content of a document, and 401 is a list of policy entities. Policy entities represent the smallest units of policies. In the list, WORM stands for write once read many. High level enterprise policies are formulated by combining policy entities. For instance, a high level policy could be: move data, encrypt it, and retain it for 7 years. It could be a policy for data cleansing by finding undesirable files, for instance, video and music files and deleting them. In FIG. 4, 404 represents enterprise documents, 405 is a metadata extractor, 406 a text extractor and parser, 108 is a full text search engine, 102 is a rule-based classification means, and 114 is a non-rule-based classification means. The non-rule-based classification means 114 is a computationally intensive classifier, utilizing one or a combination of Bayesian, Linguistic and Semantic, Support Vector Machine and neural networks or other similar methods. The metadata extractor 405 uses software utilities to extract metadata included in documents and stores extracted metadata in the metadata repository 105. The text extractor and parser 406 extracts text from documents and parses the text to extract the metadata listed in 402. It stores extracted metadata in the metadata repository 105. The full text search engine 108 builds a search index for enterprise data and stores the index in the search index repository 106. The rule-based classification means 102 performs classification based on metadata by accessing the metadata repository 105. The rule-based classification means 102 also formulates search queries as part of a rule-based classification process. The full text search engine 108 processes the query and performs full text search by accessing the search index repository 106. The rule-based classification means uses the result of full text search in data classification.

The non-rule-based classification means 114 accesses enterprise documents and performs data classification based on computationally intensive classification methods. The means for tagging classified data and assigning tags to a taxonomy node 414, tags the results of classification by the rule-based classification means 102 and the results of classification by the non-rule-based classification means 114. It assigns the tag to a taxonomy node by including it in the attributes of the node. The policy engine 412 combines policy entities to form a high level policy. The means to assign a high level policy to a taxonomy node 413 includes a high level policy generated by the policy engine 412 in the attribute of a taxonomy node. The means for applying a high level policy to tagged data 415 applies the policy to tagged data in a populated taxonomy node.

Figure 5:
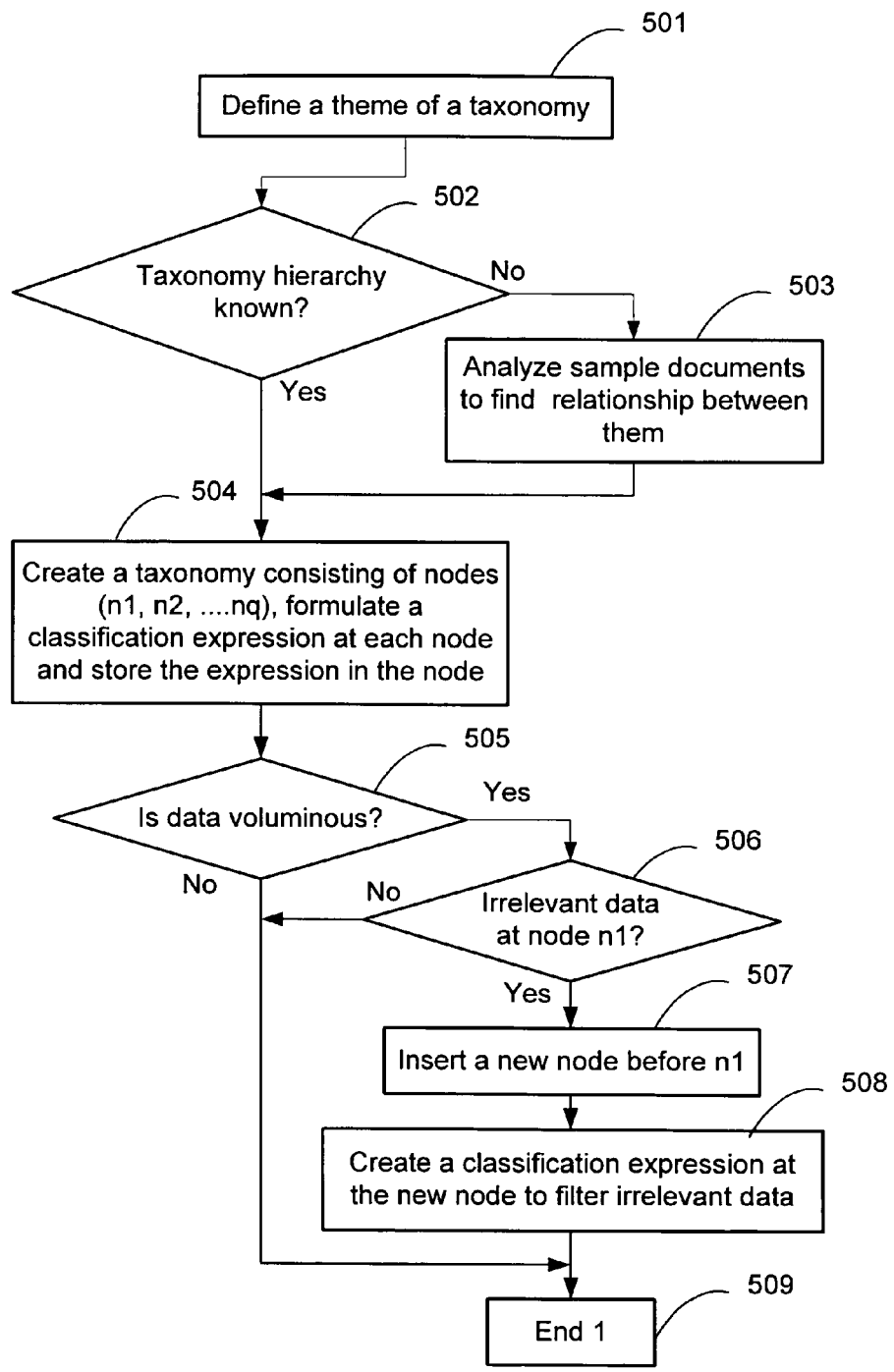
FIG. 5 is a flowchart illustrating creation of a theme for taxonomy.

FIG. 5 is a flowchart illustrating creation of a theme for taxonomy. A theme of a taxonomy is the central topic addressed by the taxonomy. In step 501, a theme of a taxonomy is defined. In decision step 502, if the taxonomy hierarchy is not known execution proceeds to step 503. In step 503, sample documents are analyzed to find the relationship between them. The relationship between sample documents reflects the relationship between all documents. Analysis of sample documents can be achieved by opening them and viewing their content, or can be attained by using full text and metadata search. Relationship between documents could also be found by using one or a combination of statistical, linguistic, neural networks, vector analysis methods or other similar methods. After relationship between documents is found, execution proceeds to step 504. In step 504 a taxonomy consisting of nodes (n1, n2, . . . nq) is created. A classification expression is formulated at each node and is stored in the node. Then, execution proceeds to decision step 505. In decision step 502, if the taxonomy hierarchy is known, execution proceeds to step 504. In decision step 505, if data is voluminous, execution proceeds to step 506. Before deciding whether data is voluminous or not one needs to determine the amount of data to be processed by the taxonomy. Determining the amount of data is important in particular when computationally intensive classification needs to be executed. As data increases, the time and resources needed to classify the data and process it increase. To decide whether data is voluminous or not depends on the power of the available computers and resources needed to process data in a timely manner. Resources include disk storage, communication bandwidth and memory. In installations where the computers are powerful and the resources are plentiful, voluminous data can be quantified in terms of hundreds of terabytes or even in terms of multiple petabytes (thousands of terabytes). If computers are not powerful and the resources are limited, voluminous data can be quantified in terms of a fraction of a terabyte or a few gigabytes. Recently, a new phrase "Big Data" has been used to describe voluminous data. It is not defined in terms of being larger than a certain terabytes or petabytes of data. In many cases it is defined as data whose size is beyond the ability of typical software tools to capture, store, manage, and analyze.

In decision step 506, the data at node 1 is examined to find if there is irrelevant data, that does not impact accuracy of the taxonomy. If there is irrelevant data execution proceeds to step 507. In step 507, a new node is inserted before n1, the first node of the taxonomy and execution proceeds to step 508. In step 508, a classification expression is created at the new node to filter out irrelevant data. The new node reduces the amount of data processed by subsequent nodes. It becomes part of the taxonomy. For example, assume that product marketing is the theme for the taxonomy. Suppose the data tagged by the tag stored in the first node in that taxonomy was examined and it was found that it includes outdated documents about old products that are no longer supported. A new node can be inserted before the first node. The new node includes a rule-based classification expression to filter out the outdated documents so as to exclude them from processing by subsequent nodes. In decision step 506, if there is no irrelevant data, execution ends at 509. In decision step 505, if there is no voluminous data, execution ends at 509.

In another embodiment of the invention more than one node is inserted before the first node to eliminate irrelevant data.

Figure 6:
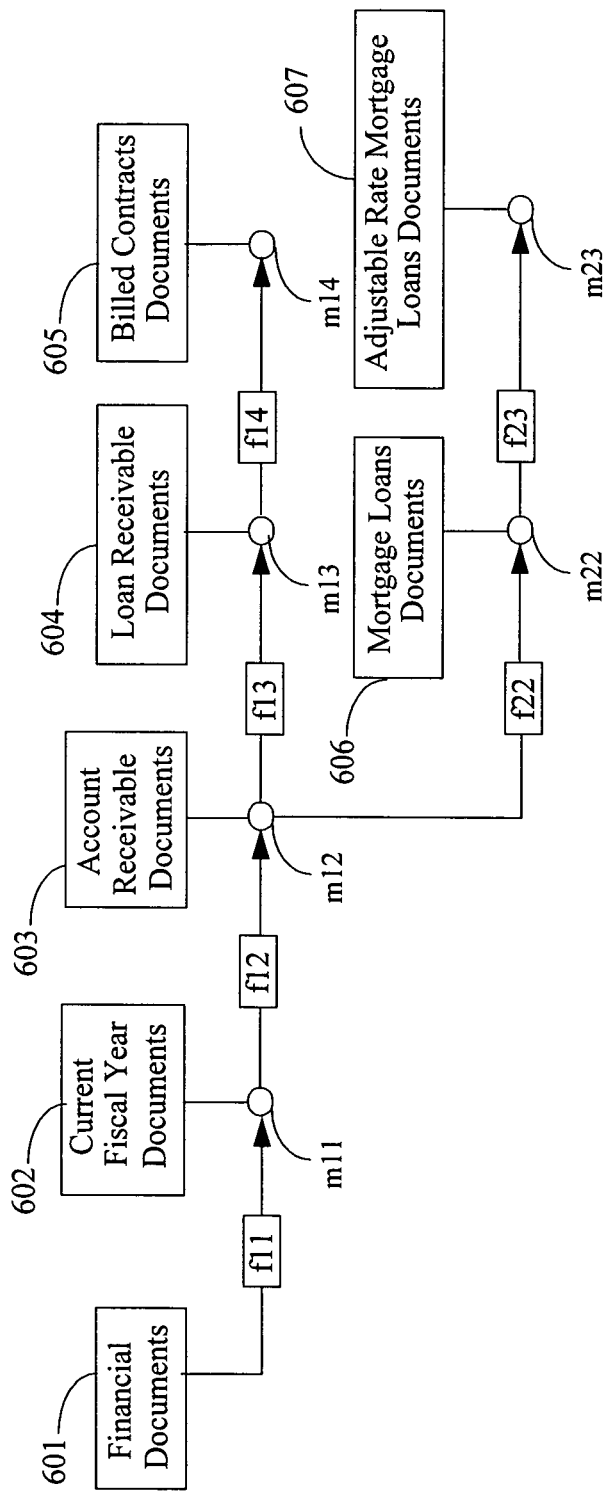
FIG. 6 is an example of a taxonomy theme for financial institutions.

Taxonomy themes could be created for different enterprises and organizations in the areas of finance, energy, health care, aerospace, insurance, pharmaceuticals, utilities, food production and distribution, chemicals, academic, environmental, etc. FIG. 6 is an example of a taxonomy theme for financial institutions. The theme of the taxonomy is account receivables. In this example, the focus is on how the hierarchy of nodes is established and as a result node attributes are not covered. The data source 601 contains financial documents of different types. The financial documents are classified based on the current fiscal year using the classification expression f11 and are tagged. Node m11 is added and the tag is stored there. Documents tagged with the tag stored in node 11 are current fiscal year documents (602). The documents owned by m11 are classified to identify account receivable documents using classification expression f12 and are tagged. Taxonomy node m12 is added and the tag is stored there. Documents tagged with the tag stored in node m12 are account receivable documents (603). The documents owned by m12 are classified to identify loan receivable documents using classification expression f13 and are tagged. Taxonomy node m13 is added and the tag is stored there. Documents tagged with the tag stored in node m13 are loan receivable documents (604). The documents owned by m13 are classified to identify billed contracts documents using classification expression f14 and are tagged. Taxonomy node m14 is added and the tag is stored there. Documents tagged with the tag stored in node m14 are billed contracts documents (605). Node m14 is the leaf node. Nodes m11, m12, m13, and m14 are the main branch of the taxonomy. The taxonomy includes another branch starting at node m12. The documents owned by m12 are classified to identify mortgage loans documents using classification expression f22 and are tagged. Taxonomy node m22 is added and the tag is stored there. Documents tagged with the tag stored in node m22 are mortgage loans documents (606). The documents owned by m22 are classified to identify adjustable rate mortgage loans documents using classification expression f23 and are tagged. Taxonomy node m23 is added and the tag is stored there. Documents tagged with the tag stored in node m23 are adjustable rate mortgage loans documents (607). Node m23 is a leaf node. More branches could be added to obtain information about different aspects of account receivables. Policies could be attached to different nodes of the account receivable taxonomy. The policies could be related to retention, archiving, security and risk management and regulations. Data analysis could be performed at different nodes of the taxonomy. For instance, analysis could be performed on node n23 to determine the impact of increasing mortgage rates.

Figure 7:
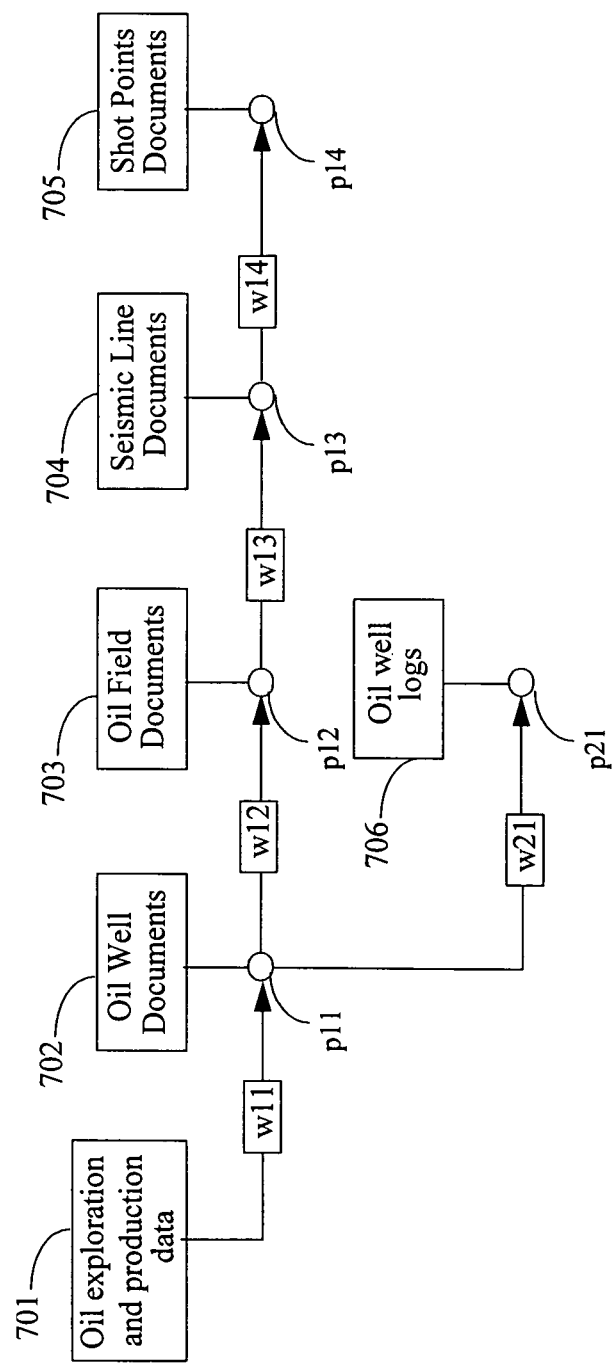
FIG. 7 is an example of a taxonomy theme for oil companies.

FIG. 7 is an example of a taxonomy theme for oil companies. The theme of the taxonomy is data about oil wells. In this example, the focus is on how the hierarchy of nodes is established and as a result node attributes are not covered. The data source 701 contains oil exploration and production data. The oil exploration and production data is classified to identify oil well documents using the classification expression w11 and are tagged. Taxonomy node p11 is added and the tag is stored there. Documents tagged with the tag stored in node p11 are oil well documents (702). The documents owned by node p11 are classified to identify data about the oil field to which the well belongs using classification expression w12 and are tagged. Taxonomy node p12 is added and the tag is stored there. Documents tagged with the tag stored in node p12 are oil field documents (703). The documents owned by p12 are classified to identify seismic line documents using classification expression w13 and are tagged. Taxonomy node p13 is added and the tag is stored there. Documents tagged with the tag stored in node p13 are seismic line documents (704). The documents owned by p13 are classified to identify data about shot points using classification expression w14 and are tagged. Shot points are holes where explosives are detonated to create seismic shock waves. Shock waves could also be generated by "thumper" trucks that create sound waves by pounding a steel plate against the land surface. Taxonomy node p14 is added and the tag is stored there. Documents tagged with the tag stored in node p14 are shot points documents (705). The taxonomy includes one branch starting at node p11. The documents owned by p11 are classified to identify oil well logs using classification expression w21 and are tagged. Taxonomy node p21 is added and the tag is stored there. Documents tagged with the tag stored in node p21 are oil well logs (706). Data management and analysis could be performed on different nodes of the oil well taxonomy.

Figure 8:
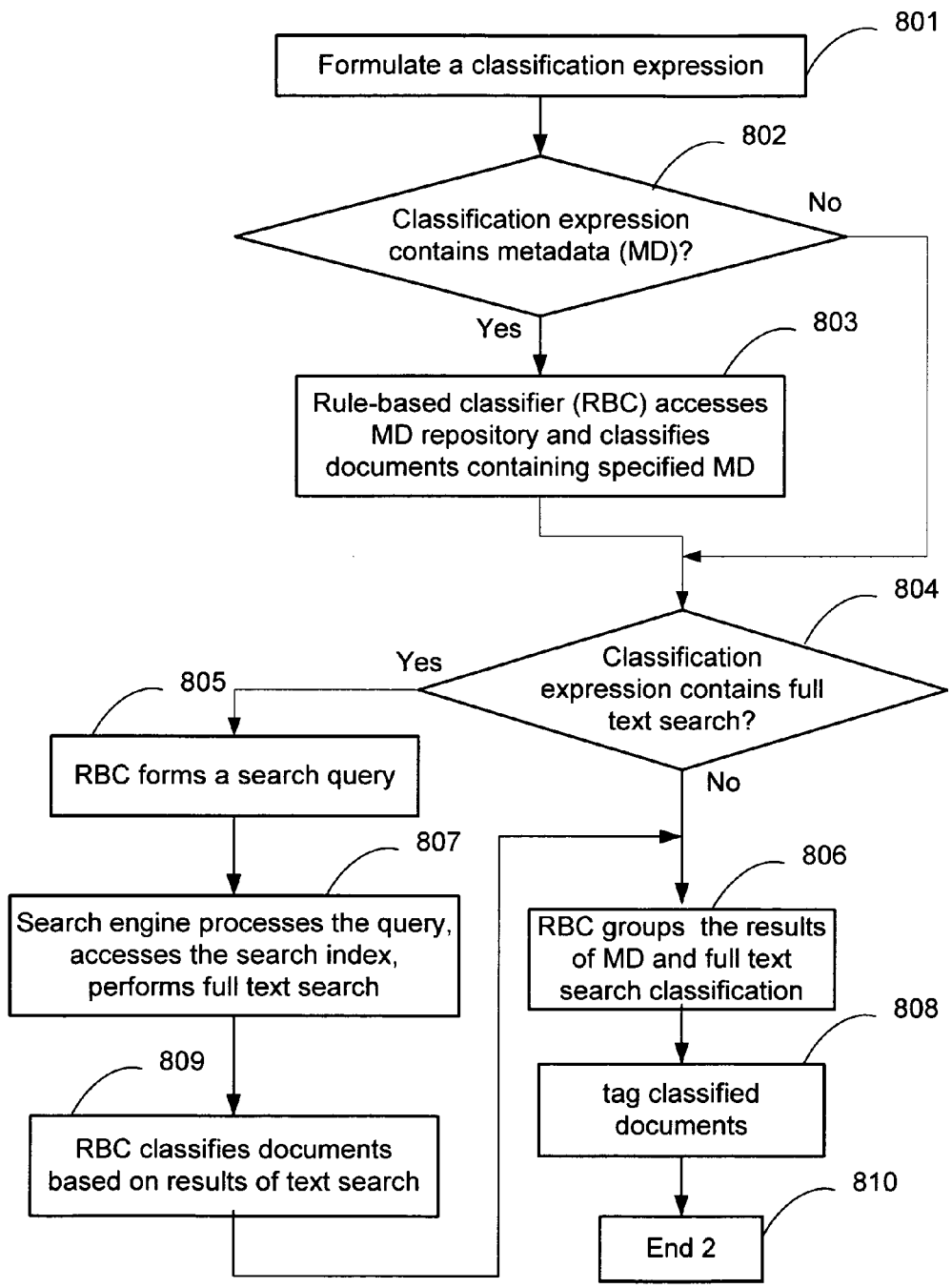
FIG. 8 is a flowchart illustrating steps for classification and tagging based on metadata and full text search.

FIG. 8 is a flowchart illustrating steps for classification and tagging based on metadata and full text search. Some of the steps in the flowchart refer to the attributes shown in 201, in FIG. 2. In step 801, a classification expression is formulated. In decision step 802, if the classification expression contains metadata, execution proceeds to step 803. In step 803, a rule-based classifier (RBC) accesses MD repository and classifies documents containing specified MD. Then, execution proceeds to decision step 804. In decision step 802, if the classification expression does not contain metadata, execution proceeds to decision step 804. In decision step 804, if the classification expression contains full text search, execution proceeds to step 805. In step 805, the rule-based classifier (RBC) forms a search query. In step 807, the search engine processes the query, accesses the search index, and performs full text search. In step 809, the rule-based classifier (RBC) classifies documents based on results of full text search. Then, execution proceeds to 806. In decision step 804, if the classification expression does not contain full text search, execution proceeds to step 806. In step 806, the rule-based classifier groups the results of metadata and full text search classification. In step 808, classified documents are tagged. The flowchart ends at step 810.

Figure 9:
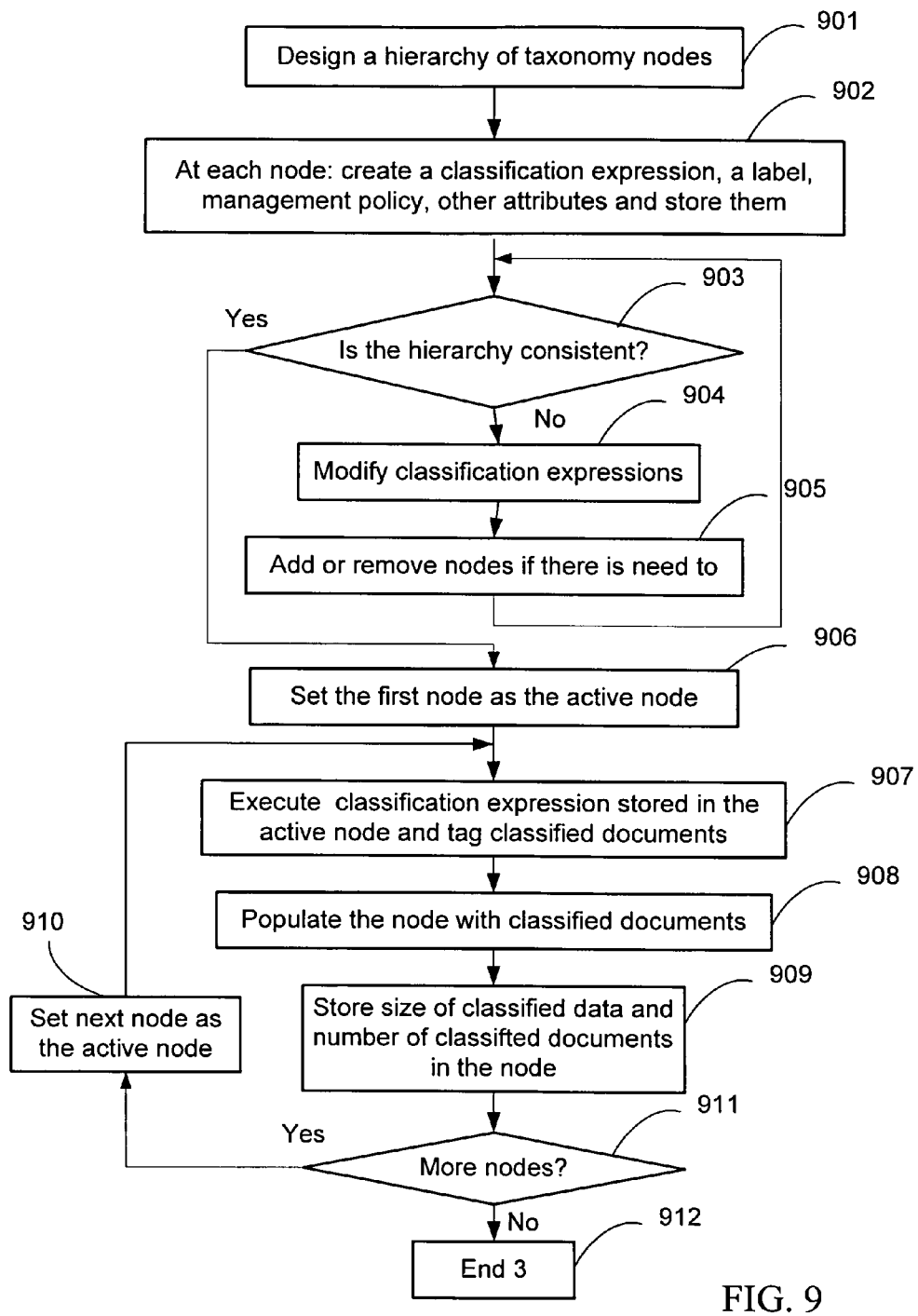
FIG. 9 is a flowchart illustrating creation and population of nodes of a taxonomy for data management and analysis.

FIG. 9 is a flowchart illustrating creation and population of nodes of a taxonomy for data management and analysis. In step 901, a hierarchy of taxonomy nodes is designed. In step 902, at each node: a classification expression, a label, management policy, and other attributes are created and stored (node attributes are included in 201 in FIG. 2). In decision step 903, it is verified if the hierarchy is consistent by analyzing classification expressions and the relationship between the nodes. If it is not consistent, execution proceeds to step 904. In step 904, classification expressions are modified. In step 905 nodes are added or removed, if there is need to, to make the hierarchy consistent. Then, execution returns to decision step 903. The process is repeated until the hierarchy is made consistent. During this process the hierarchy of the taxonomy may be changed. The change can involve both the classification expressions and the number of nodes. In decision step 903, if the hierarchy is consistent, execution proceeds to step 906. In step 906, the first node is set as the active node. In step 907, the classification expression stored at the active node is executed and classified documents are tagged. In step 908, the node is populated with classified documents. In step 909, the size of classified data and the number of classified documents are stored in the node. In decision step 911, if there are more nodes, execution proceeds to step 910. In step 910, the next node is set as the active node and execution returns to step 907. In decision step 911, if there are no more nodes execution ends at 912.

Figure 10:
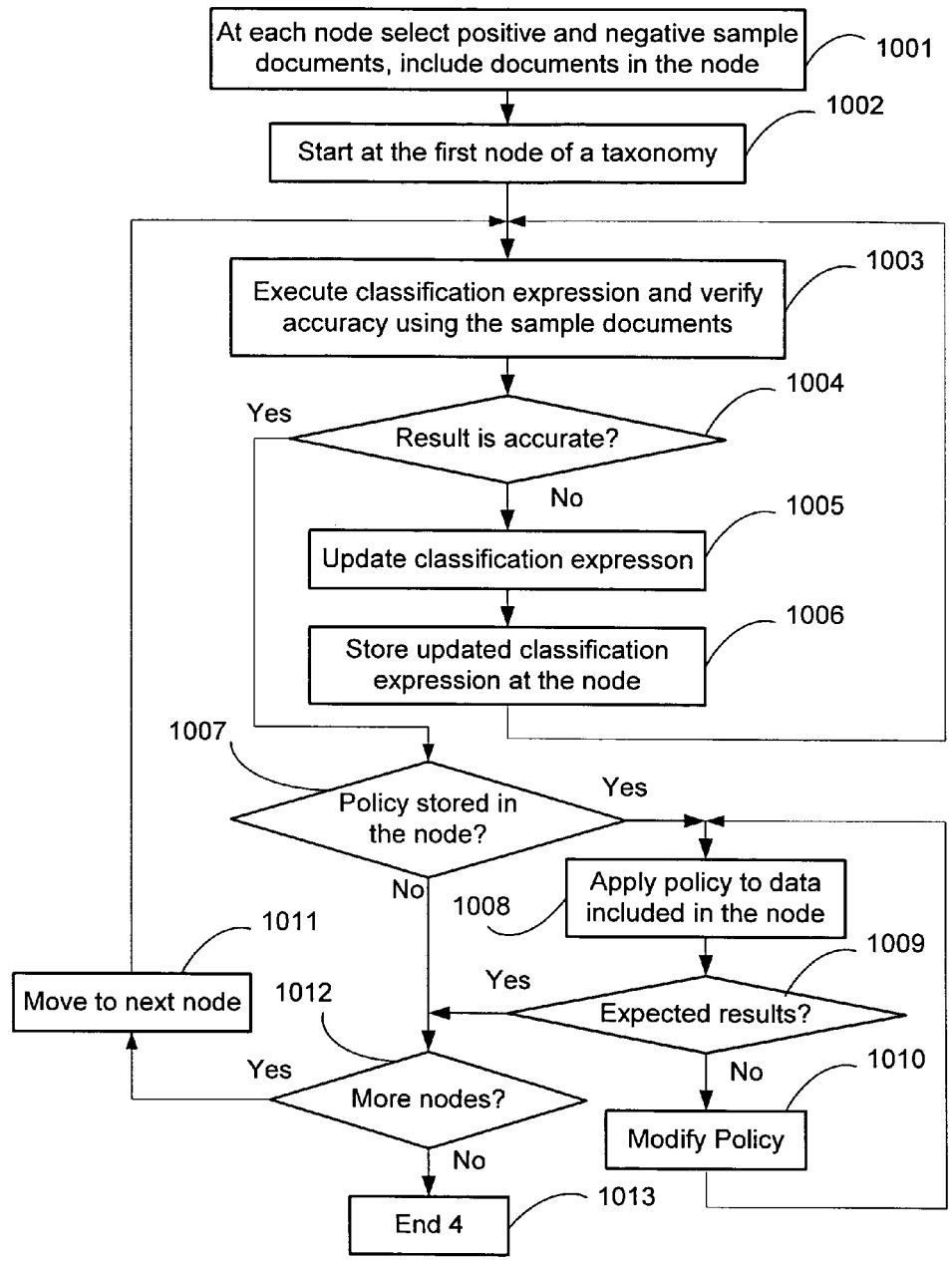
FIG. 10 is a flowchart illustrating verification of a taxonomy for data management and analysis.

FIG. 10 is a flowchart illustrating verification of a taxonomy for data management and analysis. In step 1001, at each node positive and negative sample documents are selected and are included in the node. Positive sample documents are expected to be included in a class specified by a classification expression. Negative sample documents are excluded by the classification expression. In step 1002, start at the first node of a taxonomy. In step 1003, the classification expression stored in the node is executed and the accuracy of the result is verified using the sample documents stored at the node. In decision step 1004, if the result is not accurate execution proceeds to step 1005. In step 1005, the classification expression is updated. In step 1006, the updated classification expression is stored in the node. Then, execution returns to step 1003. If in the decision step 1004, the result is accurate, execution proceeds to the decision step 1007. In decision step 1007, if management policy is stored in the node, execution proceeds to step 1008. In step 1008, the policy is applied to data included in the node. If in decision step 1009, the results of applying the policy is not as expected, the policy is modified in step 1010 and execution returns to step 1008. If in the decision step 1009, the results of executing the policy is as expected, execution proceeds to decision step 1012. In decision step 1007, if no management policy is stored in the node, execution proceeds to decision step 1012. In decision step 1012, if there are more nodes, execution proceeds to step 1011. In step 1011, processing is moved to the next node and execution returns to step 1003. In decision step 1012, if there are no more nodes, execution ends (step 1013).

Within a taxonomy, a node that includes a computationally intensive classification method may exist. In such cases, it is desirable to reduce the amount of data processed by that node. In one aspect of the invention, data reduction is provided before executing computationally intensive classification at a node within a taxonomy. This is attained by inserting a node before the node that includes intensive classification. The inserted node includes a rule-based expression to filter out irrelevant data that does not impact the accuracy of the computationally intensive classification.

Figure 11:
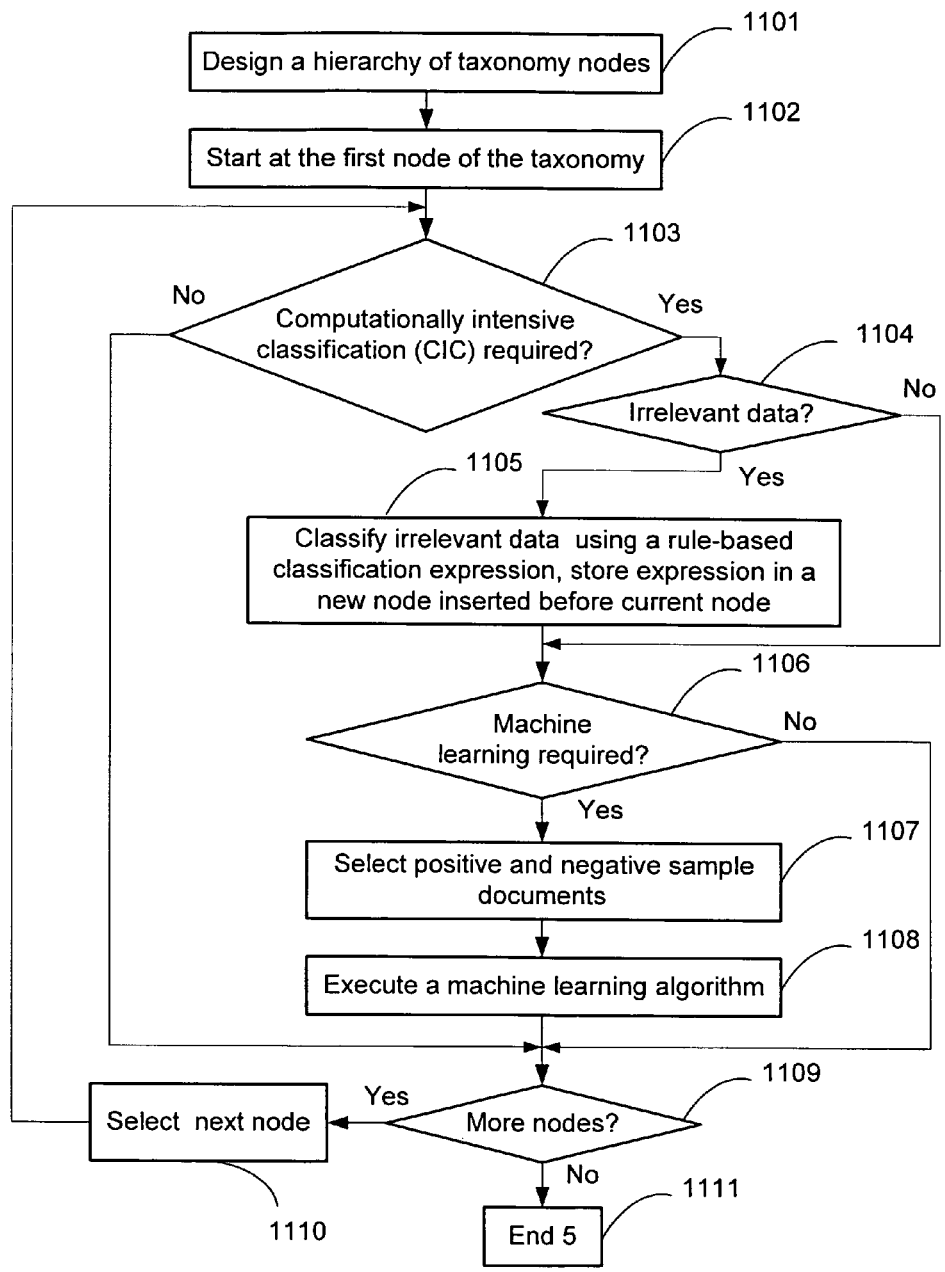
FIG. 11 is a flowchart illustrating data reduction before execution of computationally intensive classification at a node within a taxonomy.

FIG. 11 is a flowchart illustrating data reduction before execution of computationally intensive classification at a node within a taxonomy. In step 1101, a hierarchy of taxonomy nodes is designed. In step 1102, start at the first node of a taxonomy. In decision step 1103, if computationally intensive classification (CIC) is required, execution proceeds to decision step 1104. In decision step 1104, if there is irrelevant data that does not impact accuracy of classified data at children nodes, execution proceeds to step 1105. In step 1105, the irrelevant data is classified using a rule-based classification expression and the expression is stored in a new node and the node is inserted before current node. The classification expression filters out the irrelevant data before it is processed by the node with computationally intensive classification method. Then, execution proceeds to decision step 1106. In decision step 1104, if there is no irrelevant data, execution proceeds to decision step 1106. In decision step 1106, if machine learning is required, execution proceeds to step 1107. In step 1107, positive and negative sample documents are selected. In step 1108, a machine learning algorithm is executed. Then, execution proceeds to decision step 1109. If in decision step 1106, machine learning is not required, execution proceeds to decision step 1109. In decision step 1103, if computationally intensive classification is not required, execution proceeds to decision step 1109. In decision step 1109, if there are more nodes, execution proceeds to step 1110. In step 1110, next node is selected and execution returns to decision step 1103. In decision step 1109, if there are no more nodes, execution ends at step 1111.

In another embodiment of the invention, data reduction is attained by inserting a node to filter out irrelevant data before a node that includes complex post-processing data analysis.

In another embodiment of the invention, computationally intensive classification and post-processing data analysis methods are applied to data at leaf nodes of a taxonomy tree. Since leaf nodes have less data than other nodes, less computing resources are needed and execution takes less time.

In another embodiment of the invention, computationally intensive classification methods and data analysis are applied to data at nodes other than leaf nodes in a taxonomy tree.

Existing enterprise data changes over time, sometimes at a very high rate. The changes are due to modification of existing data and creation of new data. Changes in data may render existing taxonomies for data management and analysis incomplete and inaccurate. When this happens an enterprise has to re-build the affected taxonomies. If data is voluminous, rebuilding a taxonomy may take a long time. One way to avoid rebuilding the taxonomy is to perform incremental classification on data that has been added or modified.

Figure 12:
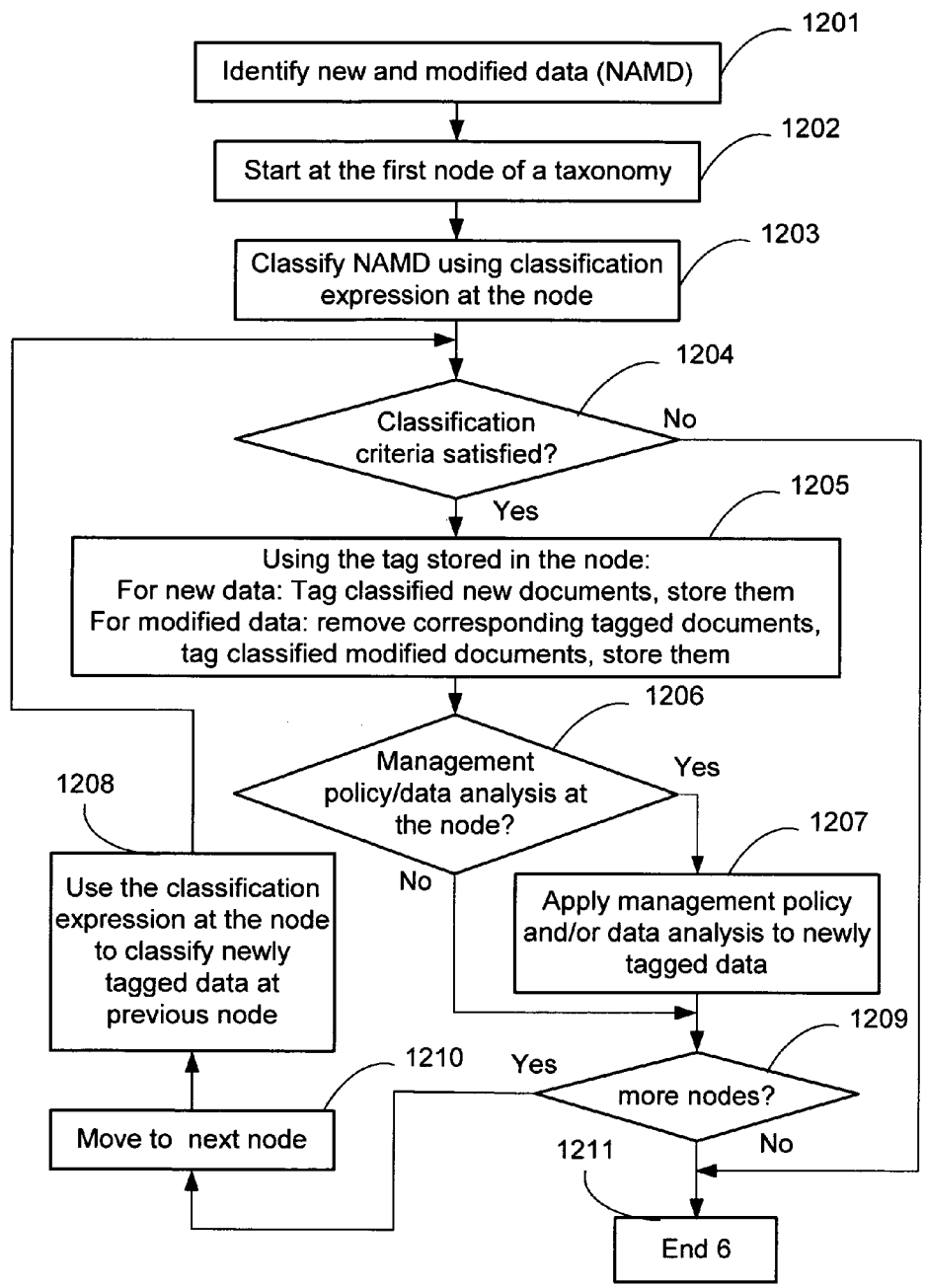
FIG. 12 is a flowchart illustrating rebuilding a taxonomy using incremental classification. Like reference symbols in the various drawings indicate like elements.

FIG. 12 is a flowchart illustrating rebuilding a taxonomy using incremental classification. In step 1201, new and modified data (NAMD) is identified. In step 1202, start at the first node of a taxonomy. In step 1203, the new and modified data (NAMD) is classified using classification expression at the node. In decision step 1204, if the classification criteria is not satisfied, execution ends at step 1211. If the classification criteria is satisfied, execution proceeds to step 1205. In step 1205, using the tag stored in the node, classified new documents are tagged and are stored. Concerning modified documents, the corresponding tagged documents that belong to the node are removed. Using the tag stored in the node, classified modified documents are tagged and are stored. In decision step 1206, if a data management policy or data analysis method is included in the node execution proceeds to step 1207. In step 1207, data management policy and/or data analysis are applied to the newly tagged data. Then, execution proceeds to decision step 1209. If in decision step 1206, there is no management policy and no data analysis at the node, execution proceeds to decision step 1209. In decision step 1209, if there are more nodes execution proceeds to step 1210. In step 1210, processing is moved to next node. In step 1208, the classification expression at the node is used to classify newly tagged data at the pervious node. Then, execution returns to decision step 1204. In decision 1209, if there are no more nodes, execution ends at 1211.

In general in one embodiment of the invention, when data is modified or new data is added, incremental classification is performed rather than performing the time consuming process of re-classification of all data. In incremental classification only new and modified data is classified using classification expressions stored in a hierarchy of taxonomy nodes. Data management policies and/or data analysis methods are executed on new and/or modified data. Incremental classification takes less time than rebuilding a taxonomy.

For instance, assume the theme of a taxonomy is product marketing and assume that the hierarchy of the taxonomy consists of: enterprise data, marketing and sales documents, documents created during the last five years, products shipped to Europe, and product A. If new data is added to enterprise data and/or existing data is modified, then the new and/or modified data is classified first to determine whether it includes marketing and sales documents. If there are no marketing and sales documents, executing ends. If there are marketing and sales documents, the documents are tagged with the tag included in node representing marketing and sales. The newly tagged documents are then classified using the classification expression stored in the next node (node representing documents created during the last five fiscal years). If no documents are found, execution ends. If there are documents, they are classified and tagged with the tag stored in the node representing documents created during the last five years. This process is applied to other nodes.

CONCLUSION, RAMIFICATION, AND SCOPE

Accordingly, the reader will see that the present invention provides system and method for generating taxonomy for enterprise data management and analysis. Building taxonomies is based on defining taxonomy themes to solve different aspects of enterprise data management and analysis. For each theme, a taxonomy is built by classifying data related to the theme using rule-based and non-rule-based classification methods. When data is voluminous irrelevant data that does not impact the accuracy of the taxonomy is filtered out first to reduce the amount of data included in the taxonomy or amount of data processed by nodes within the taxonomy.

While the above description contains several specifics these should not be construed as limitations on the scope of the invention, but rather as examples of the some of the preferred embodiments, thereof. Many other variations are possible. For example taxonomy could be built for data other than enterprise data, or data owned by other organizations, for instance, scientific data, academic data, data owned by government agencies, environmental data, etc. In other embodiments, themes and their corresponding taxonomies could automatically be generated using machine learning algorithms and computationally intensive classification. The taxonomies could also be used to allow instant access to the right information within exponentially growing volumes of data.

The invention has been described in terms of particular embodiments. Other embodiments are within the scope of the following claims. For example, steps of the invention can be performed to a different order and still achieve desirable results.

What is claimed is:

1. A computer system providing taxonomy for enterprise data management and analysis, the system comprising:
   interface to a computer network, said computer network including data stored in devices attached to it;
   means to access said data;
   metadata extraction means;
   metadata repository;
   full text search engine of the data;
   index repository;
   classification means to classify said data, wherein said classification means are applied to extracted metadata and wherein said classification means are applied to the result of full text search;
   means to create data management policies, each said data management policy including one or more actions to be performed on data, wherein said actions include:
   modify data read/write and access permissions;
   encrypt data;
   retain data;
   ensure data security;
   ensure data protection;
   means to apply a data management policy to classified data;
   means to create a hierarchy of enterprise data management taxonomy nodes, wherein each of said nodes includes:
   classification criteria used by said classification means to classify data belonging to the preceding node in the taxonomy; and
   classified data created by said classification means using said classification criteria;
   number of classified documents; wherein
   one or more of said nodes include a data management policy and wherein at each node that includes a data management policy, said management policy is applied to data included in said each node.

2. The system of claim 1, further comprising:
   data reduction means to reduce data included in a taxonomy, said data reduction means include a classification criteria to classify irrelevant data that does not impact the accuracy of said taxonomy;
   means to create a new node and insert said new node before the first node of said taxonomy, said new node includes said classification criteria; wherein said classification criteria filters out irrelevant data.

3. The system of claim 2, further comprising:
   data reduction means to reduce data included in a node within a taxonomy, said data reduction means include a classification criteria to classify irrelevant data that does not impact the accuracy of data included in said node within a taxonomy;
   means to create a new node and insert said new node before said node within a taxonomy, said new node includes said classification criteria, wherein said classification criteria filters out irrelevant data.

4. The system of claim 3, further comprising computationally intensive classification means and computationally intensive post-processing data analysis means applied to data at a node where data reduction means have been used to reduce data at said node, said computationally intensive classification means and said computationally intensive post-processing data analysis means take a long time to execute and need more resources when data is not reduced.

5. The system of claim 1, further comprising:
   incremental data classification means, said means use classification criteria included in a taxonomy node, said means classify new documents added after a taxonomy has been created, said means classify documents modified after a taxonomy has been created, said means start incremental classification at the root node of a taxonomy then move down the hierarchy of said taxonomy, wherein at each node said means remove documents that have been modified, add classified new documents, and add classified modified documents; wherein incremental data classification takes less time and resources than rebuilding said taxonomy; and
   means to apply data management policies and data analysis to said classified new documents and said classified modified documents.

6. The system of claim 1, wherein said computer system accesses data stored in devices directly attached to it.

7. The system of claim 1, said classification means can be combined using AND, OR, and NOT, otherwise known as Boolean operators, to define classification more accurately, said classification means are used to create a hierarchical taxonomy tree in which the number of classified documents at a node is less than the number of classified documents at the parent node.

8. The system of claim 1, further comprising machine learning classification means, said machine learning classification means are based on providing positive sample documents expected to be included in a node and negative sample documents not expected to be included in a node, said machine learning classification means use said positive sample documents and said negative sample documents to decide whether subsequent presented documents belong to a taxonomy node.

9. The system of claim 1, further comprising means to define a plurality of themes represented in an enterprise data, wherein for each theme, a taxonomy is built by classifying data related to the theme and wherein said taxonomy includes data related to the theme of the taxonomy.

10. The system of claim 1, wherein a taxonomy node comprising post-processing data analysis means said post-processing data analysis means are applied to classified data at said node.

11. A computer implemented method for creating a hierarchical taxonomy system for enterprise data management and analysis comprising:
    interface to a computer network, said computer network including data stored in devices attached to it;
    accessing data stored in said computer network;
    extracting metadata of said data;
    storing said metadata in metadata repository;
    storing full text index of said data in index repository;
    performing full text using a search engine accessing said index repository;
    classifying said data, wherein data classification is based on metadata and full text search;
    creating high level data management policies, each said high level data management policy including policy entities, wherein each said policy entity includes one or more actions to be performed on data, wherein said actions include:

modify data read/write and access permissions;
delete data;
move data;
write once read many;
encrypt data;
retain data;
audit data;
applying said high level data management policy to classified data;
creating a hierarchy of enterprise data management taxonomy nodes, wherein each of said nodes includes:
classification criteria used to classify data;
classified data created using said classification criteria; wherein
one or more of said nodes include a high level data management policy and wherein at each node that includes a high level data management policy, applying said management policy to data included in said each node;
one or more of said nodes include data analysis methods, said data analysis methods applied to data included in said each node; and
comprising creating a plurality of themes relating to enterprise data management and analysis, wherein for each theme a taxonomy is built by classifying data related to the theme.

12. The method of claim 11, further comprising:
reducing data processed by a taxonomy by including a classification criteria to classify irrelevant data that does not impact the accuracy of said taxonomy;
creating a new node and inserting said new node before the first node of said taxonomy, said new node includes said classification criteria, wherein said classification criteria filters out irrelevant data.

13. The method of claim 12, further comprising:
reducing data processed by a node within a taxonomy by including a classification criteria to classify irrelevant data that does not impact the accuracy of data included in said node within a taxonomy;
creating a new node and inserting said new node before said node within a taxonomy, said new node includes said classification criteria; wherein said classification criteria filters out irrelevant data.

14. The method of claim 11, further comprising:
incrementally classifying new documents using classification criteria included in taxonomy nodes, wherein said new documents are added after a taxonomy has been created;
incrementally classifying modified documents using classification criteria included in taxonomy nodes, wherein said documents are modified after a taxonomy has been created;
starting incremental classification at the root node of a taxonomy then moving down the hierarchy of said taxonomy; wherein at each node removing documents that have been modified, adding classified new documents and adding classified modified documents; wherein incremental data classification takes less time and resources than rebuilding said taxonomy; and
applying data management policies and data analysis to said classified new documents and said classified modified documents.

15. The method of claim 11, further providing access to data stored in devices connected directly to said computer.

16. The method of claim 11, further comprising methods to add branches starting at any node of an existing taxonomy tree.

17. A computer system providing taxonomy for enterprise data management, the system comprising:
interface to a computer network, said computer network including data stored in devices attached to it;
means to access said data;
means to access data stored in devices directly attached to said computer system;
means to access data in a cloud computing environment;
means to extract metadata;
means to perform full text search;
classification means to classify data accessible to said computer system, said classification means are applied to metadata and said classification means are applied to result of full text search;
means to create a hierarchy of enterprise data management taxonomy nodes, wherein each of said nodes includes:
classification criteria used by said classification means to classify data belonging to the parent node in the hierarchy;
classified data created by said classification means using said classification criteria;
means to create data management policies, wherein some policies ensure compliance with federal regulations;
means to apply said data management policies to classified data; wherein one or more of said nodes include data management policy; and wherein in each node that includes a data management policy said management policy is applied to data included in said each node.

18. The system of claim 17, further comprising:
means for creating a plurality of themes relating to data management and analysis, wherein for each theme a taxonomy is built by classifying data related to the theme;
means for creating data management policies related to the theme of said taxonomy, wherein said data management policies are applied to data included in one or more nodes of said taxonomy; and
means for data analysis related to the theme of said taxonomy, wherein said means for data analysis perform analysis of data included in one or more nodes of said taxonomy.

19. The system of claim 17, further comprising means to create a taxonomy for data in multiple cloud computing environments, and means to create a taxonomy for data in a plurality of cloud computing environments and a plurality of non-cloud computing environments.

* * * * *